United States Patent [19]

Grinwald

[11] Patent Number: 4,813,698

[45] Date of Patent: Mar. 21, 1989

[54] MINE ROLLER CONNECTION FOR A TANK

[75] Inventor: Israel M. Grinwald, West Bloomfield, Mich.

[73] Assignee: The United States of America as represented by the Secretary of the Army, Washington, D.C.

[21] Appl. No.: 150,113

[22] Filed: Jan. 29, 1988

[51] Int. Cl.[4] .............................................. B60D 1/10
[52] U.S. Cl. ................................................. 280/460.1
[58] Field of Search ............... 280/186, 460 A, 460 R, 280/504, 457

[56] References Cited

U.S. PATENT DOCUMENTS 4,282,621  8/1981  Anthony et al. ............... 280/186 X
4,723,473  2/1988  Grinwald ..................... 280/460 A X Primary Examiner—Charles A. Marmor
Assistant Examiner—Mitchell J. Hill
Attorney, Agent, or Firm—Peter A. Taucher; David L. Kuhn

[57] ABSTRACT

Connection device for releasably attaching a mine roller assembly to a military tank including an actuator controlled from within the tank. The actuator means includes a hydraulic cylinder exterior to the tank hull protected from projectiles by other, more durable components of the connection mechanism and includes a biasing member to maintain the connection device in an attaching mode should the cylinder fail. The connection device optionally includes a bracket which allows quick mounting or demounting of the hydraulic cylinder from the tank.

12 Claims, 3 Drawing Sheets

PRIOR ART 4,813,698

MINE ROLLER CONNECTION FOR A TANK

GOVERNMENT INTEREST

The invention described herein may be manufactured, used, and licensed by or for the Government for governmental purposes without payment to me of any royalty.

BACKGROUND AND SUMMARY OF THE INVENTION

This invention relates to mechanism for attaching a mine roller assembly to a military tank. A mine roller assembly is a device that is pushed along the ground in front of a tank to explode enemy mines laid in the ground or merely lying on the ground.

The mine roller assembly comprises a number of heavy steel rollers oriented alongside one another, with little or no spacing between the rollers; individual rollers are floatably mounted so that each roller exerts its full weight on the terrain. As the roller device is pushed forward, the individual rollers depress the earth to detonate any enemy mines therebeneath.

Detonation forces of exploding mines cause the rollers to be lifted from the earth surface. Considerable strain is placed on the roller suspension mechanisms and the connections between the mine roller and tank.

The present invention relates to a simple low cost connection mechanism for attaching the mine roller to the tank. A particular object is to provide a connection mechanism that will withstand blast forces, without permitting the mine roller device to become detached from the tank. Another object is to provide a connection mechanism having a minimum of hardware exposed to enemy fire or flying debris from exploding mines. Another object is to permit a tank crew member to detach the mine roller assembly from the tank without exiting the tank or exposing himself to enemy fire.

The above objects are met by a connection mechanism controlled by a hydraulic cylinder pressurized by a pump in the tank. The cylinder is protectively disposed beneath an overhanging hull surface and is shielded by plates extending from this surface to engage the mine roller assembly. Additional protection for the cylinder may be provided by a bracket assembly encircling the cylinder and detachably mounting the cylinder to the tank hull surface.

THE DRAWINGS

FIG. 2 shows the mechanism in the detached condition, whereas FIG. 1 shows the mechanism in the attached (latched) condition.

FIG. 3 is generally the view taken along line 3—3 of FIG. 6 except that FIG. 3 additionally shows a hydraulic latch actuator and associated structure.

FIG. 5 is generally the view taken along line 5—5 in FIG. 6 except that FIG. 5 additionally shows a hydraulic latch actuator and associated structure.

PRIOR ART ARRANGEMENT

Figure 1:
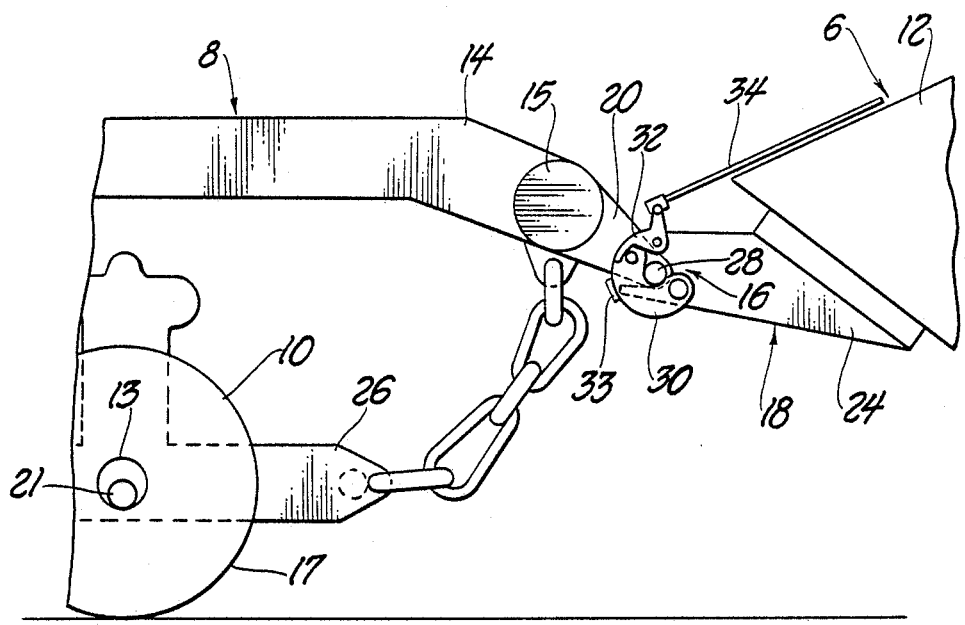
FIGS. 1 and 2 are fragmentary side elevational views of a conventional mechanism for attaching a mine roller assembly to the front end of a military tank.
Figure 2:
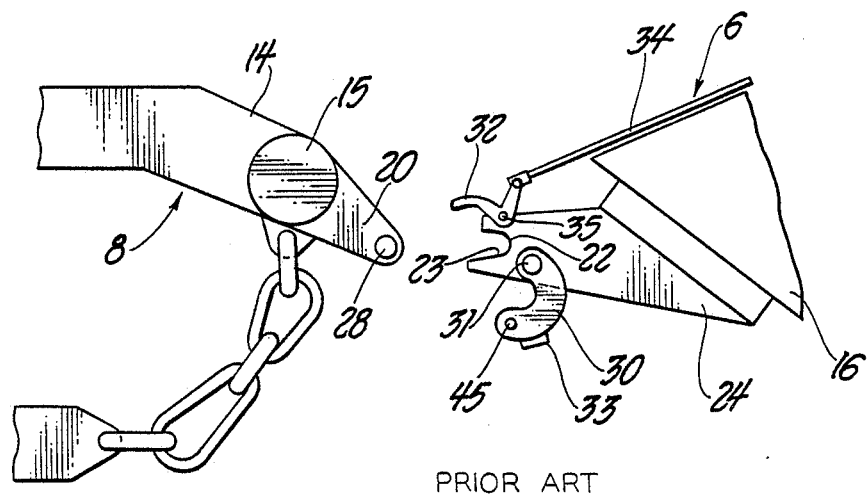

FIGS. 1 and 2 depict a prior art mechanism for connecting an armored tank 6 and a mine roller assembly 8. FIG. 1 shows tank 6 and mine roller 8 assembly in detached condition and FIG. 2 shows tank 6 and mine roller assembly 8 in attached condition. A more detailed description of this prior art mechanism is given in my U.S. Pat. No. 4,693,164 issued Sept. 15, 1987, which is hereby incorporated by reference. A brief description of this prior art mechanism is included here for convenience.

The mine roller assembly 8 includes a carriage 26 on which is mounted a set of heavy, closely spaced rollers 10 in parallel relation to one another. Rollers 10 rotate about transverse carriage shafts 21 which extend from carriage 26 through roller apertures 13. The diameter of apertures 13 is larger than that of carriage shafts 21 so that rollers 10 can traverse over rough or uneven terrain without lifting an adjacent roller off the ground. Mine roller assembly 8 includes one or more pusher beams 14 supported on carriage 26 and extending generally horizontally above the rollers 10. Extending transversely from the rearward end of the pusher beams are tubes 15 upon which tapered plates 20 are mounted. At the smaller end of tapered plates 20 are pins 28 extending normally from either side of the plates.

For each tapered plate 20, tank 6 has a complimentary pair of parallel plates 24 mounted to tank hull 12. Each pair of parallel plates 24 is spaced apart by a distance slightly greater than the width of tapered plates 20 in order to accommodate tapered plates 20 therebetween. At the ends of parallel plates 24 are notches 23 for receiving pins 28 of the mine roller assembly 8. Hinged to the outside surfaces of parallel plates 24 by means of hinge pins 31 are pairs of hooks 30 to which latch bars 45 are fastened. Hooks 30 are welded together by connective plate 33 so that they can swing upward in unison to close notch 23. Also hinged to one of each pair of parallel plates 24 is a crank arm 32 fixed to a rotatable crank arm shaft 35 which typically extends between two sets of parallel plates 24. A tie rod 34 attached at its forward end to crank arm 32 is typically mounted at its rearward end to the upper surface of tank hull 12 at a point not shown.

To connect mine roller assembly 8 to tank 6, mine roller assembly 8 is advanced toward tank 6 until plates 20 fit between pairs of plates 24 and transverse pins 20 engage notches 23. Hooks 30 are swung upward from their position shown in FIG. 1 to their positions shown in FIG. 2, whereby transverse pins 28 are captured in notch 23. Hooks 30 and notch 23 now define a generally circular aperture of larger diameter than pins 28 so that mine roller assembly can freely rotate up or down about an axis passing transversely through notches 23. Tie rod 34 then actuates crank arm 32 to swing it counterclockwise into its FIG. 1 position, thereby engaging latch bar 45 to keep hook 30 closed. To release mine roller assembly 8 from tank 6, crank arm 34 is swung clockwise by tie rod 34 to release hook 30, whose weight then swings it downward and away from notch 23. Notch 23 is now open so that mine roller assembly 8 can be moved away from tank 6.

In operation, mine roller assembly 8 is connected to tank 6 and pushed through terrain having land mines on or just below the surface. When mine roller assembly 8 hits a mine, the resulting explosion rotates mine roller assembly 8 upwards about the axis passing transversely through notch 23. Transverse pins 28 strike and rebound from the rear surface 22 of notch 23 and subsequently strike hook 30. Vertical movements of pin 28 in notch 23 are limited by the upper and lower surfaces of notch 23.

While the above prior art mechanism for connecting mine rollers to tanks is generally satisfactory, it is believed that a potential problem exists when pins 28 strike against hooks 30. The resulting impact is transferred to latch bar 45 which tends to cam against the underside of crankarm 32, potentially rotating latch bar 45 clockwise and allowing hook 30 to swing down. Pin 28 can then escape from notch 23 whereby mine roller assembly 8 is unintentionally released from tank 6.

DESCRIPTION OF THE INVENTION

Figure 3:
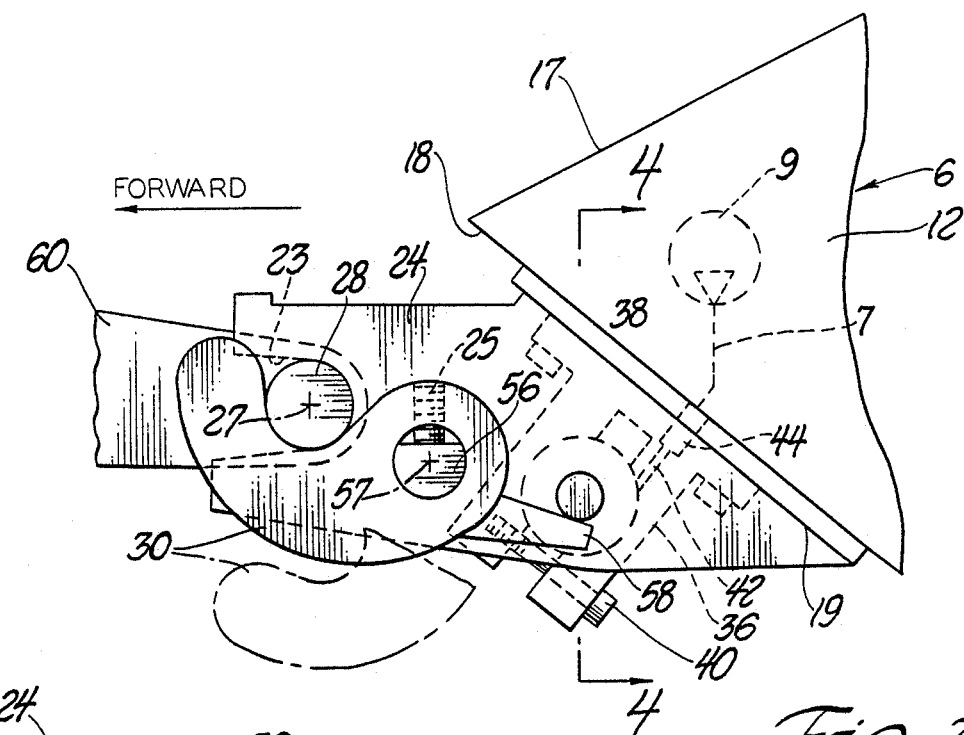
FIG. 3 is a side elevational view of the first embodiment of my connection mechanism.
Figure 6:
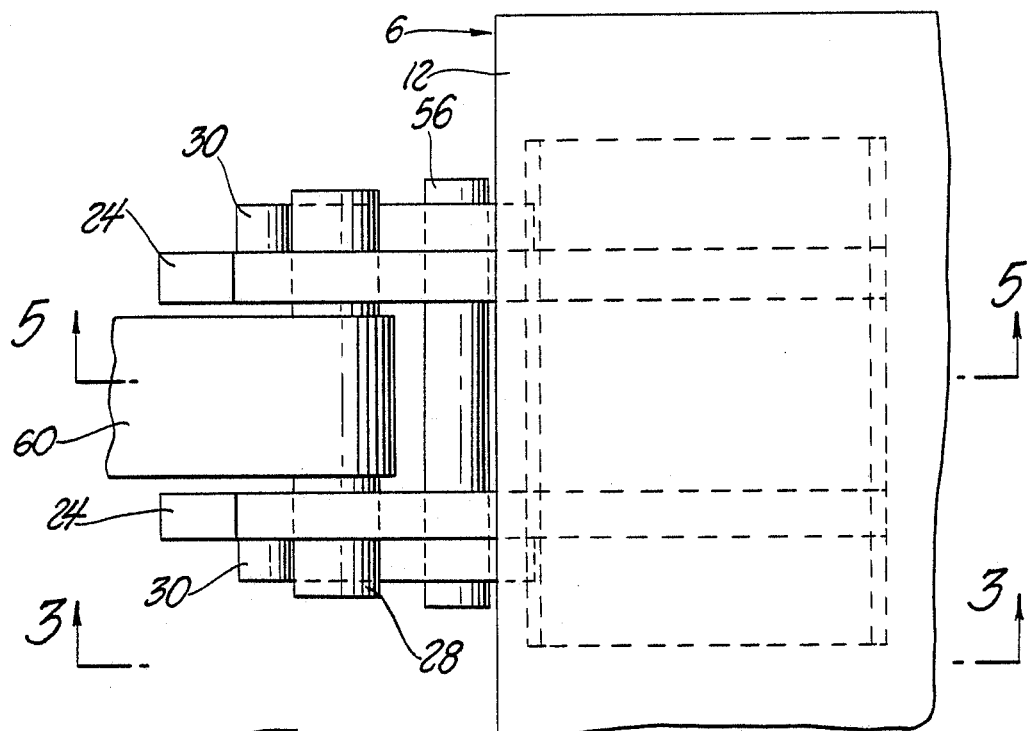
FIG. 6 is a plan view of my connection mechanism omitting the hydralic latch actuator and associated structure.

The first embodiment of my connection mechanism is shown in FIG. 3, which is generally the view taken along line 3—3 in FIG. 6. For simplicity and clarity in the drawings, the hydraulic latch means shown in FIG. 3 (including bracket 36, cylinder 38, pin 46 and finger 58) is omitted from FIG. 6. The "forward" arrow in FIG. 3 designates the direction in which tank 6 pushes a mine roller assembly while clearing a mine field.

FIG. 3 shows an armored hull 12 of a military tank 6, hull 12 having an upper surface 17 and a lower, overhanging surface 18 facing obliquely downward. Fastened to lower surface 18 is a mounting plate 19 from which extend parallel plates 24. Plates 24 are typically spaced approximately two inches apart and terminate in notches 23 opening away from tank 6. Mounting plate 19 is preferably detachable from surface 18 so that mounting plate 19 and parallel plates 24 may be removed or replaced on tank 6 as a unit.

Bolted to mounting plate 19 between parallel plates 24 is bracket 36 having a pair of parallel arms whose arcuate recesses accommodate hydraulic cylinder 38. A bolt 40 passes through the end of one bracket arm to threadingly engage the other bracket arm so that turning bolt 40 loosens or tightens the grip of bracket 36 on hydraulic cylinder 38. Bracket 36 and bolt 40 form a structure which surrounds cylinder 38 between parallel plates 24 such that large stones or rocks can not pass between bracket 36 and one of plates 24 to strike cylinder 38. Cylinder 38 is hydraulically connected to a pump 9 inside tank 6 by means of a hydraulic line 7 leading from the pump to a hydraulic fitting 44 extending through mounting plate 19 and hydraulic line 42 connected between fitting 44 and cylinder 38. Fitting 44 and line 42 may be positioned at the upper right quadrant of cylinder 38 as viewed in FIG. 3 so that cylinder 38 is interposed between the line 42 and the source of flying debris from mine explosions, which is forward of and below the connection mechanism shown in FIG. 3.

Figure 4:
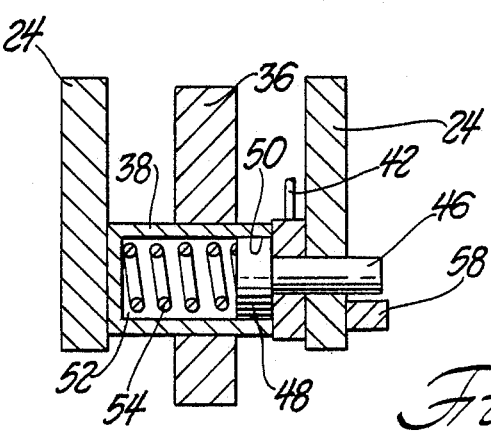
FIG. 4 is a sectional view of the hydraulic latch actuator taken along line 4—4 in FIG. 3.

Cylinder 38 can be seen in greater detail FIG. 4. The flat ends of cylinder 38 bear against the inside walls of parallel plates 24. Actuator pin 46 extends through one end of cylinder 36 and through one of parallel plates 24. At the end of actuator pin 46 inside cylinder 38 is an axially translatable piston 48 dividing cylinder 38 into two chambers 50, 52. Chamber 50 is at the side of piston 48 connected to actuator pin 46 and is in hydraulic communication with line 42 and the pump inside tank 6. On the opposite side of piston 48 is chamber 52 containing spring 54 which biases piston 48 and actuator pin to the right as seen in FIG. 4. Upon pressurization of chamber 50 by the pump, pin 46 is retracted into cylinder 38.

Forward of cylinder 38 as viewed in FIG. 3 is a pivot rod 56 extending through parallel plates 24 and having fixed at each end a hook 30. Hooks 30 are faced against the outside surface of a parallel plates 24 and are rotatable about the axis of pivot rod 56. Hook 30 forms a generally circular aperture with notch 23 when hook 30 is in the closed position shown in FIG. 3. Projecting rearwardly from hook 30 is a hook finger 58 which engages actuator pin 46 to prevent hook 30 from swinging counterclockwise under the influence of gravity. Hooks 30 may be detachably fastened to pivot rod 56 by a threaded fasteners 25 screwed through hook 30 to bear against a flat surface at the end of pivot rod 56.

Also shown in FIG. 3 is a connector beam 60 connected to a conventional mine roller assembly such as that described in conjunction with FIGS. 1 and 2. At the end of connector beam 60 are two transverse pins 28 each of which fits into one of notches 23 when connector beam 60 is inserted between parallel plates 24.

Operation of my connection mechanism shown in FIG. 3 is relatively simple. To release the mine roller assembly from tank 6, a crew member inside tank 6 actuates a pump to pressurize chamber 50 and retract actuator pin 46 into cylinder 38. Hook 30 swings counterclockwise and notches 23 are opened, whereupon connector beam 60 of the mine roller assembly can be withdrawn from between parallel plates 24. It will be noted that axis 57 of pivot rod 56 is below the axis 27 of transverse rod 28. Thus, should hooks 30 not freely swing down before tank 6 backs away from the mine roller assembly, transverse pin 28 exerts a counterclockwise torque on hook 30 to swing it away from notch 30. In some configurations of my connection mechanism, it may be desirable to eliminate this torque in order, for example, to reduce the force exerted by finger 58 on actuator pin 46. In such cases, pivot rod axis 56 may be located in horizontal alignment with axis 27 of transverse pins 28.

To reconnect the mine roller assembly, connector beam is placed between parallelplates 24 with transverse pins 28 in notches 23. Hooks 30 are swung clockwise as viewed in FIG. 3 to close notches 23 and capture transverse pins 28. Pressure to chamber 50 of cylinder 38 is released so that spring 54 translates actuator pin 46 through parallel plate 24 and over the end of hook finger 58. The Hook 30 is now held in its closed position. Hook finger 58 and actuator pin 46 prevent forward force components exerted by transverse pins 28 from rotating hooks 30. Such forwardly directed forces typically occur, as previously described, when the mine roller assembly strikes a land mine.

Should it be desired to replace cylinder 38, bracket 36 and cylinder 38 may be removed as an assembly by unbolting bracket 36 from mounting plate 19 and disconnecting line 42 from fitting 44. The reverse process may be used to install a new cylinder. For convenience in cylinder installation, bolt 40 may first be loosened to allow cylinder 38 to rotate in bracket 36. After bracket 36 is bolted to mounting plate 19, cylinder 38 may be rotated to align hydraulic line 42 for connection with hydraulic fitting 44. Then bolt 40 may be tightened to prevent subsequent rotation of cylinder 38.

ALTERNATE EMBODIMENTS

Figure 7:
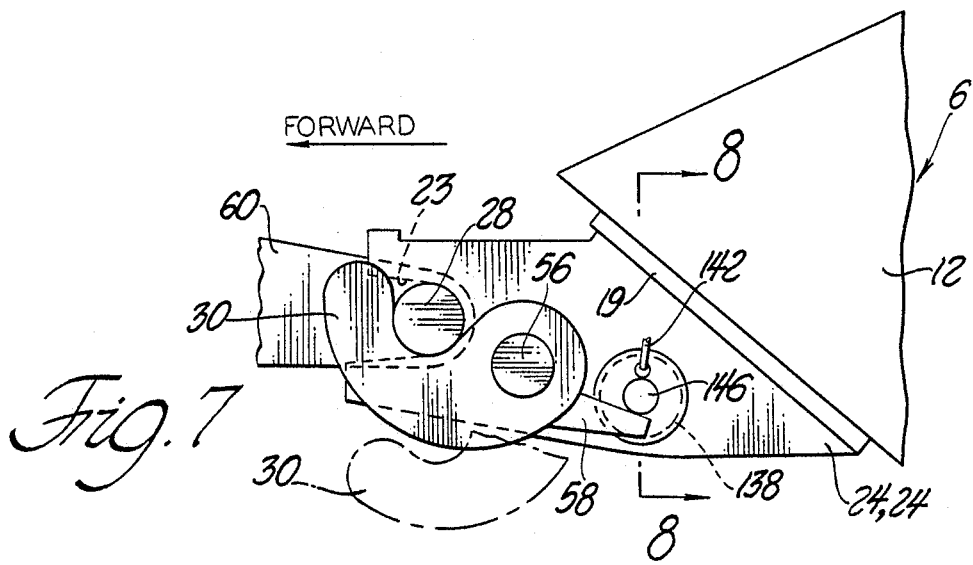
FIG. 7 is a side elevational view of a third embodiment of my connection mechanism.
Figure 8:
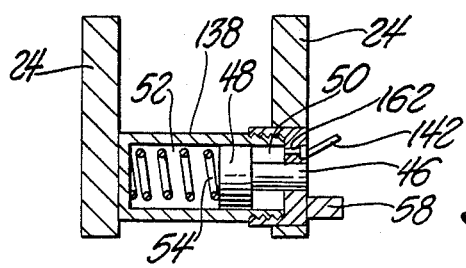
FIG. 8 is taken along line 8—8 of FIG. 7 and shows a hydraulic latch actuator in section.

A first alternate embodiment of my connection mechanism is shown in FIGS. 7 and 8 and is similar in all respects to the preferred embodiment except that cylinder 138 is fastened to parallel walls 24 and not to a bracket. The structure of cylinder 138 is the same as cylinder 38 except that one end of cylinder 138 is threaded to engage sleeve 162, which is fixed in parallel wall 24, and hydrualic line 142 extends from cylinder 138 through sleeve 162. For any given spacing between parallel walls 24, cylinder 138 will be longer than cylinder 38 because cylinder 138 extends parallel through one of parallel walls 24. Cylinder 138 consequently has a greater stroke length for actuator pin 46 than does cylinder 38 and can replace cylinder 38 in applications where a greater stroke length of actuator pin 46 is desired.

Figure 5:
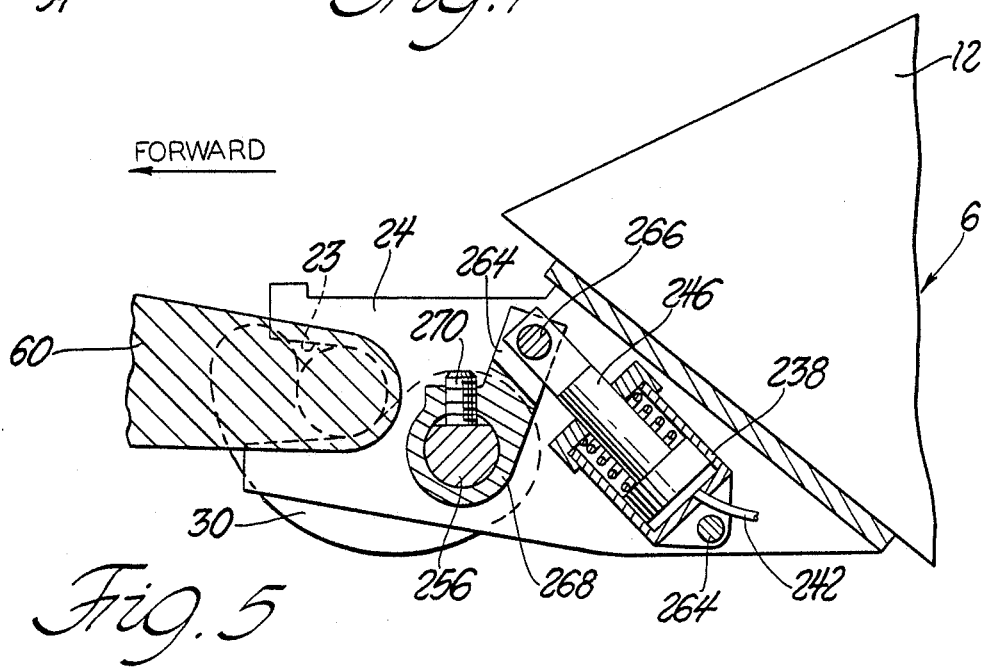
FIG. 5 is a sectional view of a second embodiment of my connection mechanism.

FIG. 5 shows a third embodiment of my connection which is generally the view taken along line 5—5 in FIG. 6. For simplicity and clarity in the drawings, the hydraulic latch means shown in FIG. 5 is omitted from FIG. 6. The FIG. 5 embodiment is similar to the preferred embodiment except that hinged cylinder 238, actuator shaft 246 and lever 264 replace cylinder 38 and associated bracket 36, actuator pin 46 and hook finger 58.

Specifically, cylinder 238 is hinged between parallel plates 24 by means of hinge pin 264. Axially translatable actuator shaft 246 extends out of cylinder 238 and is rotatably attached to one end of lever 264 by means of link pin 266. The other end 268 of link pin 264 defines an orifice through which passes pivot rod 256. Pivot rod 256 has a flat side engaged by threaded member 270 which is screwed into lever 264 so that pivot rod does not rotate with respect to lever 264. At either end of pivot rod 256 is fixed a hook 30, which swings upward to capture transverse pins 28 as previously described. When cylinder 238 is pressurized, actuator shaft 246 translates outwardly from cylinder 238, thereby rotating lever 264 and hooks 30 counterclockwise as viewed in FIG. 3 to release pins 28. Releasing pressure to cylinder 238 allows spring 254 to expand, thereby retracting actuator shaft 246 into cylinder 238. Lever 264 and hooks then rotate clockwise to release pins 28. Connector beam 60 of a mine roller assembly can then be removed from between parallel plates 24.

I wish it to be understood that I do not desire to be limited to the exact details of the construction shown. Obvious modifications to these structures may occur to those skilled in the art without departing from the spirit and scope of the appended claims.

I claim:

1. A connection device for attaching a mine roller assembly to a tank at a tank hull surface faced obliquely toward the ground, the connection device comprising:
   a pair of opposed parallel plates extending generally forwardly and horizontally from the tank hull surface, the parallel plates defining at their ends notches open away from the tank;
   a rotatable pivot rod behind said notches extending transversely between and through the parallel plates;
   a hook at either end of the pivot rod adjacent the parallel plates, the hooks being rotatable with the pivot rod to a closed position where the hooks and the notches in the parallel plates define generally circular apertures;
   a hydraulic cylinder disposed between the parallel plates on a vertical line from the tank hull surface to the ground, the cylinder further being disposed between the pivot rod and the tank hull surface;
   a means controlled by the hydraulic cylinder for preventing the hooks from rotating away from the closed position; and a means within the tank to supply pressure for the hydraulic cylinder.

2. The connection device of claim 1 wherein the preventing means includes an actuator pin extending from the cylinder normally through one of the parallel plates, the pin being retractable into the parallel plate by the hydraulic cylinder; the preventing means also including a finger protruding from one of the hooks into engagement with the actuator pin.

3. The connection device of claim 1 wherein transverse pins on a connector beam of the mine roller assembly extend normally through the generally circular apertures formed by the hooks and the parallel plates, wherein the forward ends of the hooks in their closed position form upwardly open acuate segments for partly encircling the transverse pins, and wherein the axis of the pivot rod is disposed in the same horizontal plane as the axes of the transverse pins.

4. The connection device of claim 2 further comprising a means to detachably fix at least one of the hooks to the pivot rod of connection device and a means for detachably mounting the cylinder to the connection device, and wherein the parallel plates are detachably connected to the tank hull surface.

5. The connection device of claim 4 wherein the cylinder mounting means further comprises a cylinder retention bracket detachably mounted to the tank hull surface, the bracket including a pair of cylinder gripping arms extended between and spaced from the parallel plates, each of the arms defining an arcuate recess for accommodating the cylinder, the bracket further including means for loosening and tightening the grip of the arms on the cylinder.

6. The connection device of claim 5 wherein the axial ends of the cylinder bear rotatably against opposed inner surfaces of the parallel plates.

7. The connection device of claim 6 wherein the loosening and tightening means includes a bolt passing through the end of one arm into threading engagement with the other arm such that the bracket and bolt form a protective collar around the cylinder.

8. The connection device of claim 7 including a hydraulic line for connecting the cylinder with a hydraulic fitting at the tank hull surface, the hydraulic line disposed between the parallel plates and disposed between the tank hull surface and an upper exterior cylinder surface facing the tank hull surface, whereby the cylinder protects the hydraulic line from mine explosion debris.

9. The connection device of claim 8 wherein the cylinder contains a piston connected to the actuator pin, the piston being biased by a spring to extend the actuator pin from the cylinder through the one parallel plate.

10. The connection device of claim 1 wherein the hydraulic cylinder is rotatably mounted to the parallel plates to pivot in a plane therebetween and wherein the preventing means includes an axially translatable shaft protruding from one end of the hydraulic cylinder, a lever between the parallel plates rotatably connected at one end to the translatable shaft and fixed at the other end to the pivot rod whereby translation of the shaft rotates the hooks on the pivot rod.

11. The connection device of claim 10 wherein the cylinder is connected to a hydraulic line extending between the parallel plates from the cylinder and through the tank hull surface.

12. The connection device of claim 11 wherein the hydraulic cylinder contains a piston connected to the axially translatable shaft and contains a spring engaging the piston to bias the shaft towards a selected axial position with respect to the cylinder; and wherein movement of the shaft towards the selected axial position causes movement of the hooks to their closed position.

* * * * *